United States Patent
Rhee et al.

(10) Patent No.: US 11,487,672 B1
(45) Date of Patent: Nov. 1, 2022

(54) MULTIPLE COPY SCOPING BITS FOR CACHE MEMORY

(71) Applicant: International Business Machines Corporation, Armonk, NY (US)

(72) Inventors: Chunggeon Rhee, Poughkeepsie, NY (US); Craig R. Walters, Highland, NY (US); Ram Sai Manoj Bamdhamravuri, Boston, MA (US); Timothy Bronson, Round Rock, TX (US); Gregory William Alexander, Pflugerville, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/407,228

(22) Filed: Aug. 20, 2021

(51) Int. Cl.
*G06F 12/0895* (2016.01)
*G06F 12/084* (2016.01)
*G06F 12/0891* (2016.01)
*G06F 12/0817* (2016.01)

(52) U.S. Cl.
CPC ........ *G06F 12/0895* (2013.01); *G06F 12/084* (2013.01); *G06F 12/0822* (2013.01); *G06F 12/0891* (2013.01)

(58) Field of Classification Search
CPC .............. G06F 12/0822; G06F 12/084; G06F 12/0891; G06F 12/0895
See application file for complete search history.

(56) References Cited

U.S. PATENT DOCUMENTS

| | | |
|---|---|---|
| 8,225,045 B2 | 7/2012 | Guthrie et al. |
| 8,327,073 B2 | 12/2012 | Guthrie et al. |
| 8,806,148 B2 | 8/2014 | Guthrie et al. |
| 9,189,403 B2 | 11/2015 | Guthrie et al. |
| 9,753,862 B1 | 9/2017 | Drerup et al. |
| 10,120,809 B2 | 11/2018 | Arellano et al. |
| 10,572,385 B2 | 2/2020 | Bronson et al. |
| 10,628,313 B2 | 4/2020 | Blake et al. |

(Continued)

OTHER PUBLICATIONS

Abraham, "Proceedings of Data Mining 2009," IADIS Multi Conference on Computer Science and Information Systems, Jun. 18-20, 2009, 216 pages.

(Continued)

*Primary Examiner* — Aracelis Ruiz
(74) *Attorney, Agent, or Firm* — Cantor Colburn LLP; Jeffrey Ingalls

(57) ABSTRACT

Aspects of the invention include computer-implemented methods, systems, and computer program products that access a multi-copy scope directory state of a cache memory that indicates a scope of sharing of a cache line in a cache memory system and determine a scope of sharing of the cache line in the cache memory system based on the multi-copy scope directory state, where the multi-copy scope directory state enumerates a plurality of scopes within the cache memory system. The scope of sharing is used to reduce a number of queries to one or more cache memories having a larger scope than a shared scope identified in the scope of sharing. The multi-copy scope directory state of the cache memory is updated based on detecting a change in shared scope of the cache line within the cache memory system.

25 Claims, 9 Drawing Sheets

(56) References Cited

U.S. PATENT DOCUMENTS 10,628,314 B2     4/2020    Blake et al.
2007/0226423 A1*   9/2007    Arimilli ................ G06F 12/084
                                                                                  711/141

OTHER PUBLICATIONS

Anonymous, "A Backward Compatible, Efficient Use of Broadcast Bandwidth When Simulcasting a Digital Television Channel in Two Related Resolutions by Use of Hierarchical Modulation and Common Chroma Components," IP.com No. IPCOM000238101D, Aug. 1, 2014, 4 pages.

Anonymous, "Bit Map Based FIFO Queue for High Performance, Low Latency Environments," IP.com No. IPCOM000255666D, Oct. 8, 2018, 4 pages.

Anonymous, "Hybrid Cache Eviction Policy for Near Caches in Spatially Distributed Cache Platforms," IP.com No. IPCOM000234682D, Jan. 28, 2014, 4 pages.

Anonymous, "Method and Apparatus for Cooperative State Prefetching in Clustered Shared Memory Multiprocessor Systems with Region Coherence Arrays," IP.com No. IPCOM000180817D, Mar. 17, 2009, 7 pages.

Anonymous, "Transparent Persistent Configuration Caching," IP.com No. IPCOM000249253D, Feb. 14, 2017, 4 pages.

Bamdhamravuri et al., "Lateral Persistence Directory States," U.S. Appl. No. 17/407,248, filed Aug. 20, 2021.

Chang, "Cooperative Caching for Chip Multiprocessors," University of Wisconsin-Madison, Computer Sciences, 2007, 160 pages.

Dougall, "Context-based Cache Filing from Peer Caches," IP.com No. IPCOM000251349D, Oct. 30, 2017, 8 pages.

Gibeling et al., "Using ChipScope," Feb. 2009, 4 pages.

IBM: List of IBM Patents or Patent Applications Treated as Related (Appendix P); Date Filed Aug. 20, 2021, 2 pages.

Kalnis et al., "An Adaptive Peer-to-Peer Network for Distributed Caching of OLAP Results," SIGMOD '02: Proceedings of the 2002 ACM SIGMOD International Conference on Management of Data, Jun. 4-6, 2002, 12 pages.

Dahlin et al., "Cooperative Caching: Using Remote Client Memory to Improve File System Performance," Proceedings of the First Symposium on Operating Systems Design and Implementation (OSDI), 1994, pp. 1-14.

* cited by examiner

MULTIPLE COPY SCOPING BITS FOR CACHE MEMORY

BACKGROUND

The present invention generally relates to data processing, and more specifically, to multiple copy scoping bits for cache memory in symmetric multiprocessing computers.

Contemporary high-performance computer systems are typically implemented as multi-node, symmetric multiprocessing ('SMP') computers with many compute nodes. SMP is a multi-processor computer hardware architecture where two or more, typically many more, identical processors are connected to a single shared main memory and controlled by a single operating system. Most multiprocessor systems today use an SMP architecture. In the case of multi-core processors, the SMP architecture applies to the cores, treating them as separate processors. Processors may be interconnected using buses, crossbar switches, mesh networks, and the like. Each compute node typically includes a number of processors, each of which may have at least some local memory, at least some of which is accelerated with cache memory. The cache memory can be local to each processor, local to a compute node shared across more than one processor, or shared across nodes. All of these architectures require maintenance of cache coherence among the separate caches.

Maintaining cache coherency can be a time-consuming process as more cache memories are interconnected within an SMP architecture. Interrogations of multiple cache memories to determine where copies of a cache line are located throughout the system can result in extended delays while waiting for the interrogations to propagate through the system and waiting for response to the interrogations, thereby reducing system performance.

SUMMARY

According to one or more embodiments of the present invention, a computer implemented method includes accessing a multi-copy scope directory state of a cache memory that indicates a scope of sharing of a cache line in a cache memory system and determine a scope of sharing of the cache line in the cache memory system based on the multi-copy scope directory state, where the multi-copy scope directory state enumerates a plurality of scopes within the cache memory system. The scope of sharing is used to reduce a number of queries to one or more cache memories having a larger scope than a shared scope identified in the scope of sharing. The multi-copy scope directory state of the cache memory is updated based on detecting a change in shared scope of the cache line within the cache memory system. Advantages can include faster updates in the cache memory system.

In accordance with additional or alternative embodiments of the present invention, the scope of sharing having a smaller scope can be a subset of the scope of sharing having the larger scope within the cache memory system. Advantages can include establish sharing for a range of scopes.

In accordance with additional or alternative embodiments of the present invention, the scope of sharing can include a chip scope as a smallest scope, a module scope, a drawer scope, and a system scope as a largest scope. Advantages can include establishing scopes associated with a hierarchy of system components.

In accordance with additional or alternative embodiments of the present invention, operations can include setting a snoop scope to a smallest scope based on determining that a requesting cache has requested a shared copy of the cache line, sending a query to one or more remote cache memories in a current snoop scope that have not already been sent a query, determining whether an intervention master copy of the cache line is found in a remote cache memory of the current snoop scope or encountering the cache line in a forward state, and installing a shared copy of the cache line in the requesting cache and updating a state of a directory entry holding a master copy of the cache line based on the intervention master copy of the cache line being found in a remote cache memory of the current snoop scope or encountering the cache line in the forward state. Advantages can include requesting a shared copy of a cache line through progressively larger scopes to reduce request and response time.

In accordance with additional or alternative embodiments of the present invention, operations can include fetching the cache line from the cache memory and updating a requesting cache directory based on one or more copies of the cache line being found in a shared non-master state after not finding the cache line in an initial snoop scope, and updating at least one remote sourcing directory of the cache line. Advantages can include maintaining the state of directories for more efficient cache management.

In accordance with additional or alternative embodiments of the present invention, operations can include determining whether a requesting cache has an intervention master shared copy of the cache line based on the requesting cache requesting an exclusive copy of the cache line, requesting invalidation of the cache line in all cache memories in a smallest snoop scope that contains a directory scope, and updating a requesting cache directory for the cache line in a requesting core to an exclusive state. Advantages can include state management of shared cache lines using scope information.

In accordance with additional or alternative embodiments of the present invention, operations can include setting a current snoop scope to the smallest snoop scope based on determining that requesting cache does not have the intervention master shared copy of the cache line, sending a query to one or more remote caches in the current snoop scope that have not already been sent a query, updating a remote cache directory to an invalid state based on a shared, not intervention master copy of the cache line in the current snoop scope, updating the requesting cache directory for the cache line to the exclusive state based on determining that an intervention master copy of the cache line is not found in a remote cache in the current snoop scope and a highest snoop scope has been reached, and setting the current snoop scope to a next larger snoop scope based on determining that the intervention master copy of the cache line is not found in the remote cache in the current snoop scope and the highest snoop scope has not been reached. Advantages can include progressive querying based on scope for cache state management.

In accordance with additional or alternative embodiments of the present invention, operations can include updating the remote cache directory for the cache line to the invalid state, and installing the exclusive copy of the cache line in the exclusive state based on finding the remote cache with the exclusive copy of the cache line in the current snoop scope and determining that the intervention master copy of the cache line is not found in the remote cache in the current snoop scope, and updating the remote cache directory for the cache line to the invalid state, and updating the requesting cache directory for the cache line to the exclusive state based on finding the remote cache with the intervention master shared copy of the cache line in the current snoop scope, and the directory scope in the remote cache is less than or equal to the current snoop scope. Advantages can include managing exclusive copies of cache lines in multiple caches.

In accordance with additional or alternative embodiments of the present invention, operations can include updating the remote cache directory for the cache line to the invalid state, and sending a query to the remote caches in the smallest snoop scope larger than the directory scope in the remote cache that have not already been sent the query based on the directory scope in the remote cache being larger than the current snoop scope, updating the remote cache directory for the cache line to the invalid state, and updating the requesting cache directory for the cache line to the exclusive state. Advantages can include managing cache directories in multiple scopes.

In accordance with additional or alternative embodiments of the present invention, operations can include using the intervention master copy of the cache line prior to a full system state being resolved based on detecting that a primary scope does not contain the intervention master copy of the cache line, a secondary scope does contain the intervention master copy of the cache line, and a larger scope broadcast has been initiated. Advantages can include early use of an intervention master copy of a cache line.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
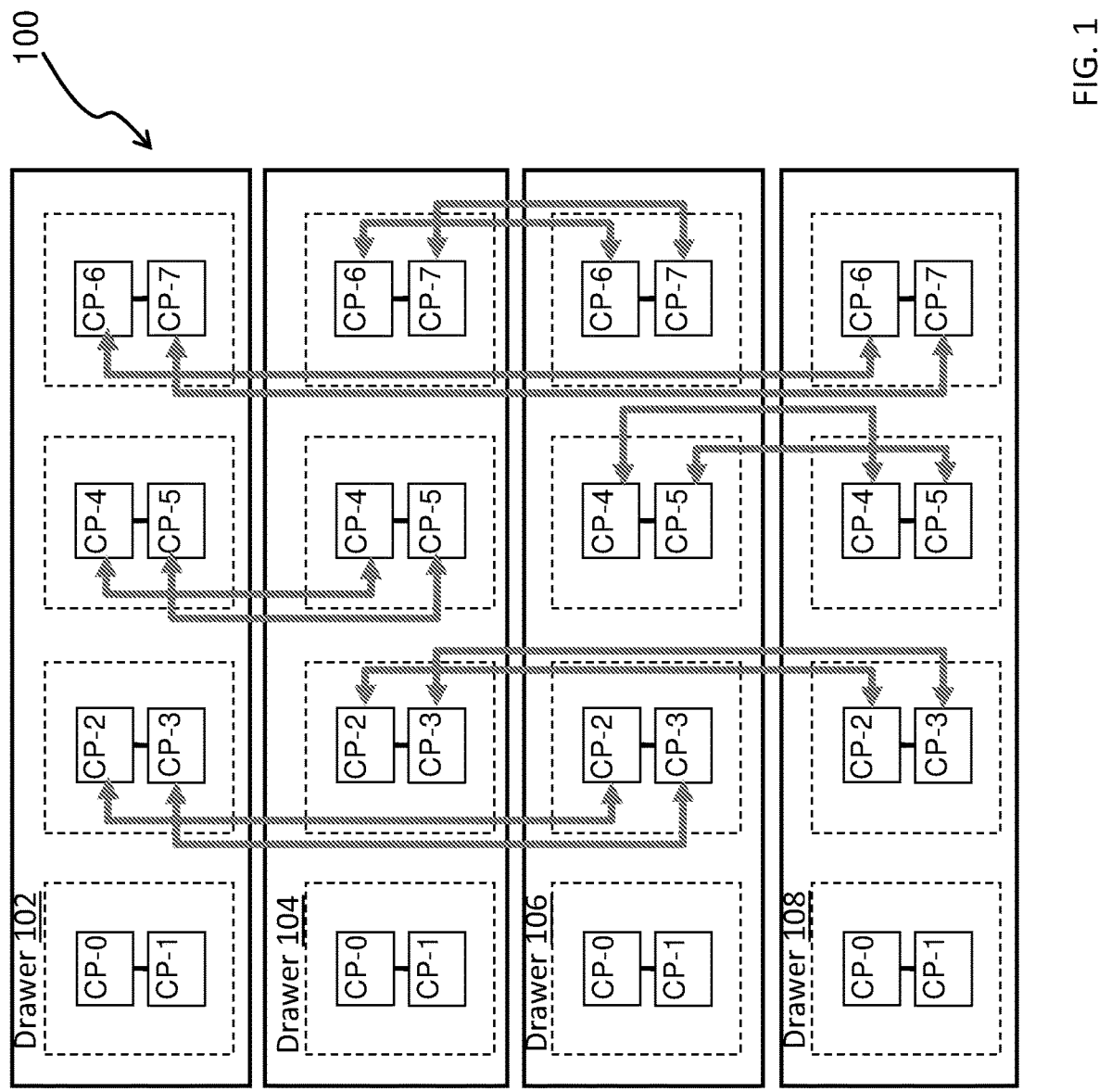
FIG. 1 depicts a distributed symmetric multiprocessing (SMP) system in accordance with one or more embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide systems and methods for using multiple copy scoping bits for cache memory in an SMP environment. The multiple copy scoping bits can define a scope of sharing of a cache line across lateral caches, for example, in an SMP environment. The multiple copy scoping bits can reduce latency and increase performance for cache state changes of cache lines as further described herein.

Traditional approaches to cache line management can use a modified-exclusive-shared-invalid (MESI) protocol to update a cache line from a shared state to an exclusive state by applying several rules. A modified state can indicate that a cache line is present only in the associated cache and has been modified such that it differs from the value stored in main memory. The exclusive state can indicate that a cache line is present only in the associated cache, and it is unmodified such that the value matches main memory. The shared state can indicate that a cache line may be stored in one or more other caches, and it is unmodified such that the value matches main memory. The invalid state can indicate that the cache line is invalid, e.g., the contents should not be used and can be overwritten. Other protocol variations include a MESIF protocol that adds a forward state, a MOESI protocol that adds an owned state, and other such variations. Where cache is distributed across multiple system components, a system-level interrogation can be used to resolve a coherent state of the system. In order to convert a cache line from the shared state to the exclusive state, all copies of the cache line in the system are typically invalidated. This approach can work correctly to maintain cache coherency but may result in performance inefficiencies in larger systems. For example, system-wide interrogations typically result in inefficient bus usage and interface bandwidth. System-wide interrogations can also result in consuming controller resources and increase operational latency.

Embodiments can reduce the impact of system-level interrogations, for example, when cache lines are converted from the shared state to the exclusive state. By expanding scope tracking using a multi-bit shared state, the scope of sharing can be defined within the system. The enhanced scope information can be used to establish a system coherence protocol that reduces system-level interrogations to a reduced domain scope. For instance, cache at a same level, such as level-3 cache, may be distributed throughout a system at a chip scope, a module scope, and a drawer scope. In this example, chip-scope cache can refer to cache at the chip-level distributed between multiple processing cores of the same chip. Module-scope cache can group cache where multiple chips are connected to the same module, such as two chips on a same card or board. Drawer-scope cache can group cache where multiple modules are connected together in a physical or logical group, such as a drawer of cards or boards, where the cards or boards in the drawer are considered modules. A system-scope cache can group all cache in the system together, such as multiple drawers. Embodiments recognize that latency and access times can vary within the system depending upon how close in scope a cache line is located. For example, accessing a cache line within the same chip can be faster than accessing a cache line in a different chip on the same module. Similarly, accessing a cache line in the same module can be faster than accessing a cache line in a different module. Access and response times can increase between drawers.

Interrogation times can be reduced by maintaining multiple copy scope directory bits that indicate the proximity of shared copies of a cache line based on where the cache line was last fetched from. For instance, if the scope bits indicate that all copies are local chip contained, the requestor only needs to interrogate the chip scope and avoid the delays associated with a full interrogation of the system. Similarly, if the scope bits indicate that all copies are module contained, the requestor only needs to interrogate the module scope. If the scope bits indicate all copies are drawer contained, the requestor only needs to interrogate the drawer scope. As cache lines migrate through the system, the multiple copy scope state can be continuously updated to reflect the furthest scope seen and cleaned up as regathering occurs.

When the multiple copy scope bits indicate all copies are contained to a local chip, there is no need to venture out into the system. Thus, a fabric broadcast can be suppressed. In the case where the multiple copy scope bits indicate not all copies are contained to the local chip, a drawer-wide broadcast can be made. If the scope bits indicate that all copies are contained within the local module, the requestor can leverage this information by not having to wait on responses from all remote chips. In the case where not all copies are contained within the local module, the requestor waits on the drawer response. If the drawer response indicates that not all copies are contained within the local drawer, a system-wide interrogation can be made to search the next level, e.g., multiple drawers. The requestor can build information from one scoping level to another to determine how far out into the system to venture in order to find and invalidate all copies of a cache line.

Depending on the state of multiple copy bits, the request type, and architectural design, a drawer-wide broadcast can be proactively performed at the time of a chip scope miss. If the bits indicate all copies are contained within the local module, the requestor can leverage this information by not having to wait on responses from all remote chips if a proactive drawer interrogation was done. In the scenario where not all copies are contained within the local module, the requestor must wait on the drawer response. Scoping information is aggregated as the request traverses the system as part of the normal coherency flow.

In embodiments, a system can maintain a multi-copy scope directory state, which includes a state for indicating chip containment. The fabric can suppress the need to venture out into the system since no other copies lie outside of the chip scope. Operational latency can be reduced because the requestor does not have to wait on responses from the remote chips. Further, bandwidth can be saved and controller busy time reduced, since there is no need to interrogate the remote caches outside of the local chip.

In cases where all copies are not contained to the local chip, a drawer-wide broadcast can be made. Upon interrogating sibling chips and determining that the multiple-copy scope bits indicate that all copies are contained within the local module, the requestor can leverage this information by not having to wait on responses from all other remote chips. Controller and bus utilization may not be significantly reduced in such a case, but operational latency can be reduced. If the scoping bits from the drawer response indicate that not all copies are contained to the local drawer, a system-wide broadcast can be made to search the next scoping level, such as a multi-drawer scope. Some bus configurations can allow for sibling chip interrogation concurrently with local chip interrogation. If all copies of the cache line are contained within the local module, there is no need to venture out further into the system. Thus, a drawer-wide broadcast can be suppressed.

FIG. 1 depicts a distributed symmetric multiprocessing (SMP) system 100 (hereafter "system 100") in accordance with one or more embodiments. System 100 can include 4 processing units or "drawers." Each drawer 102, 104, 106, 108 includes eight (8) microprocessor (CP) chips (CP0 . . . CP7) in this example. Each CP chip can include eight (8) cores. Each core in the CP chip includes a private L1 cache (including both instruction cache and data cache). These private L1 caches are backed by semi-private L2 caches. The semi-private L2 caches can interact to provide an on-chip virtual level-3 (L3) cache. Each drawer 102, 104, 106, 108 contains up to 8 CP chips with a fully connected topology providing a virtual level-4 (L4) cache. The virtual L3 and virtual L4 caches can be implemented through a set of chip caching technologies that cluster the independent physical L2 caches within a chip and within a drawer to act as a unified shared victim cache.

Virtual L3/L4 caches can be implemented by defining groups/clusters of L2 caches within a CP chip, group of CP chips, and/or drawers for evicting cache lines from peer caches. That is to say, a cache line can be evicted from a first L2 to a peer L2 within the defined groups/clusters of L2 caches according to a defined replacement policy. Embodiments can utilize virtual caches or physical caches using multiple copy scoping bits.

Figure 2:
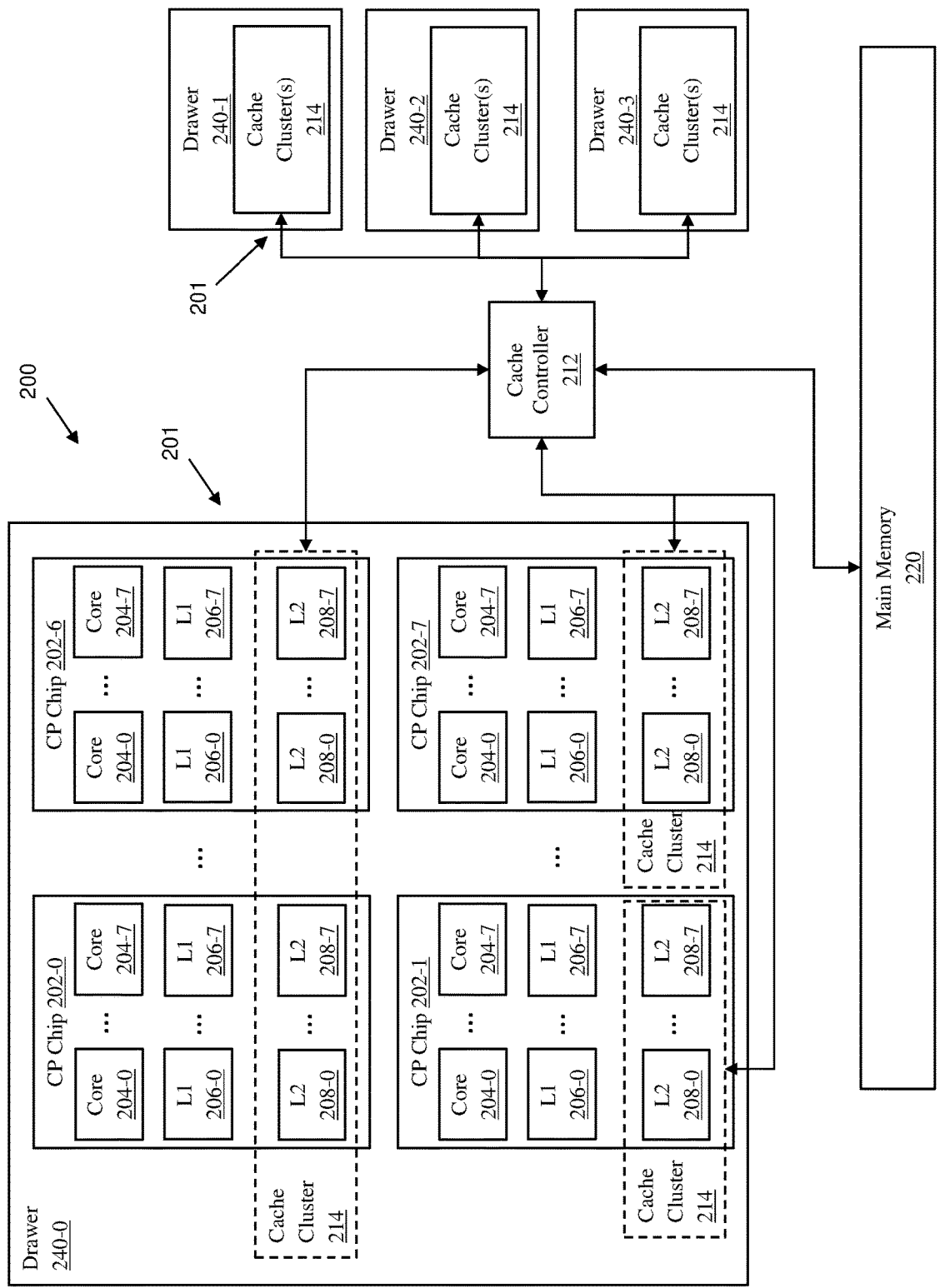
FIG. 2 depicts a block diagram of a distributed symmetric multiprocessing (SMP) system utilizing multiple copy scoping bits for cache memory according to one or more embodiments of the invention.

FIG. 2 depicts a block diagram of a distributed symmetric multiprocessing (SMP) system 200 with a cache memory system 201 according to one or more embodiments of the invention. The system 200 includes four drawers 240-0, 240-1, 240-2, 240-3. Each drawer includes the same components as described with reference to drawer 240-0. Drawer 240-0 includes 8 CP chip 202-0 . . . 202-7. Each CP chip 202 includes 8 cores 204 with each core 204 having a private level 1 (L1) cache 206. Each core 204 also utilizes a semi-private level 2 (L2) cache 208. The cache memory system 201 can include cache memory distributed through a hierarchy of levels, such as L1, L2, L3, L4, and across physical locations, such as drawer 240-0, 240-1, 240-2, 240-3.

Peer L2 caches (sometimes referred to as "lateral caches") can be divided into cache clusters 214. Each drawer 240 can include one or more cache clusters 214 that are utilized for cache lines. The illustrative example shows one configuration of the cache clusters 214; however, in one or more embodiments, the cache clusters 214 can include any number of L2 caches in any type of configuration including across drawer L2 caches in a group/cluster. Caches can be clustered within the same drawer 240-0 or in other drawers 240-1, 240-2, 240-3. Cache lines can be fetched or updated by one or more processing cores 204. Cache management policies can be implemented using a cache controller 212 to manage cache contents and states amongst the cache clusters 214 with respect to main memory 220. A replacement policy can be preferential for lateral caches 208 on a CP chip 202.

A CP chip 202 can have more than one defined cache clusters 214 as there are eight on the CP chip 202 in this example.

In embodiments, multiple copy scoping bits can be used to manage shared cache lines in one or more cache levels that are non-private, such as in L2 caches 208 in cache clusters 214, or in L3 or L4 caches, whether implemented as virtual or physical caches. The cache controller 212 can manage the use of multiple copy scoping bits across the system 200.

Figure 3:
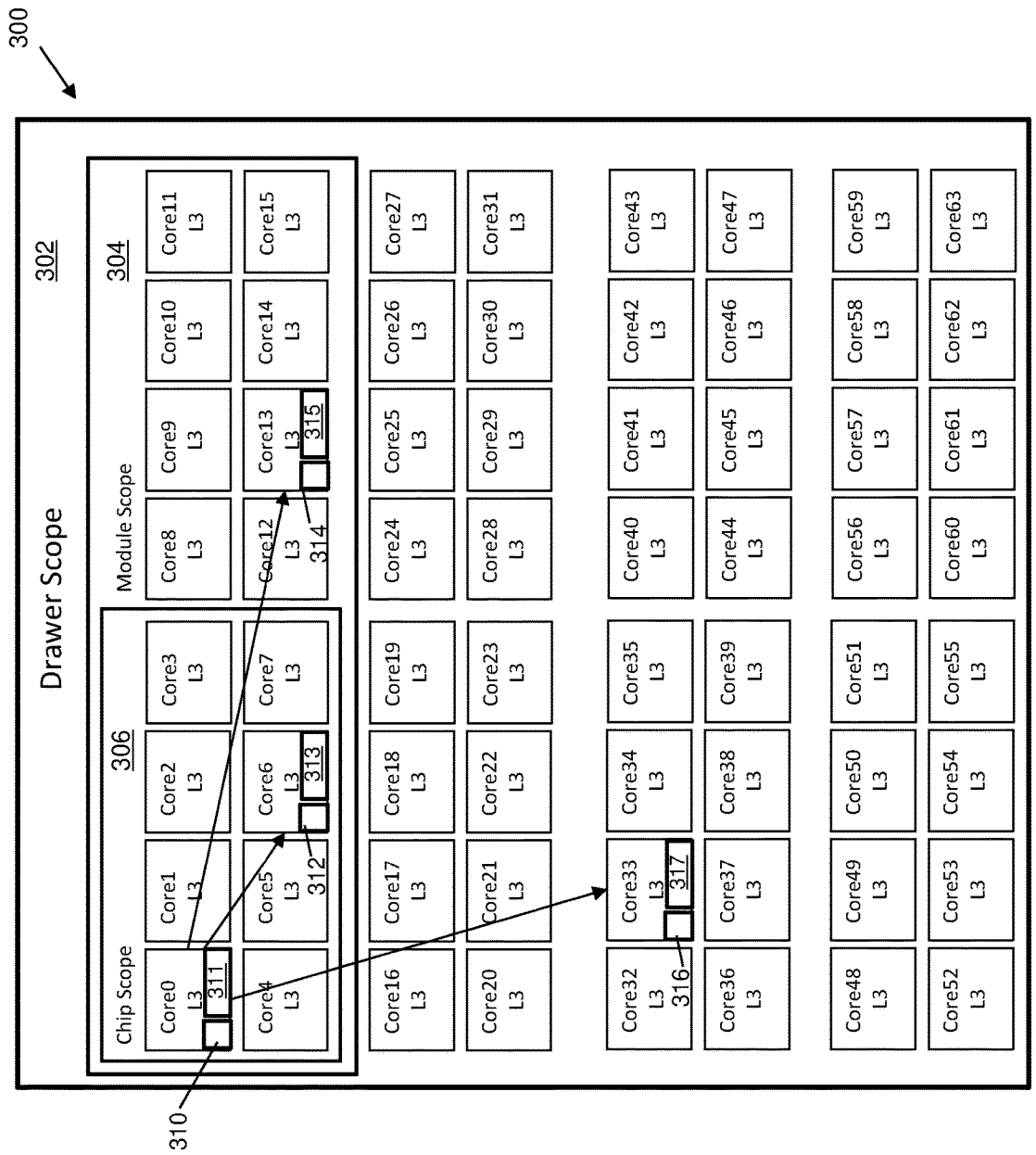
FIG. 3 depicts a block diagram of multiple scopes of cache memory according to one or more embodiments of the invention.

FIG. 3 depicts a block diagram of multiple scopes 300 of cache memory according to one or more embodiments. FIG. 3 illustrates an example of cache scopes for L3 cache of a plurality of cores (core0 to core63) within a drawer scope 302. In the example of FIG. 3, a module scope 304 is smaller than the drawer scope 302 and covers multiple chip scopes 306. L3 caches of core0, core1, core2, core3 core4, cores, core6, core7 can all be in the same chip scope 306, while the L3 cache of core8, core9, core10, core11, core12, core13, core14, and core15 are in a different chip scope 306 but the same module scope 304 as the L3 cache of core0-core7. The L3 cache of core16-core63 are in a different chip scope 306 and module scope 304 than core0-core15. For example, chip scope 306 including the L3 cache of core0-core7 can map to CP chip 202-0 of FIG. 2, L3 cache of core8-core15 can map to CP chip 202-1 of FIG. 2, where CP chip 202-0 and 202-1 are within the same module scope 304. Cache controller 212 of FIG. 2 can set and check cache directory bits for managing each cache.

In the example of FIG. 3, L3 cache of core0 can be a requesting cache that is requesting a shared copy of a cache line. Copies of the cache line may be shared, for example, in L3 cache of core6, core13, and core 33. With respect to core0, L3 cache of core6 is a cache memory within the same chip scope 306, L3 cache of core13 is a remote cache memory within the same module scope 304, and L3 cache of core33 is a remote cache memory within the same drawer scope 302. If the only shared copy of a cache line of the L3 cache of core0 was in core6, then the response time could be improved, as a system-wide or drawer-wide cache checking could be avoided. If the largest scope of the shared cache line was the module scope 304, e.g., for L3 cache of core13, then the response time would likely be improved by only checking within the module scope 304 rather than performing a system-wide or drawer-wide check. If the drawer scope 302 is the widest scope, then response time may be improved by avoiding a system-wide check, such as for drawers 240-1, 240-2, 240-3 of FIG. 2.

In the example of FIG. 3, L3 cache of core0 has a multi-copy scope directory state 310 that indicates a scope of sharing of a cache line 311 in the L3 cache of core0. Each cache line can include multiple associated cache entries that include copies of data from another memory source, such as main memory 220 of FIG. 2. A directory for each cache can include state information defining the status and scope of sharing of each cache line. Similarly, L3 cache of core6 has a multi-copy scope directory state 312 that indicates a scope of sharing of a cache line 313 in the L3 cache of core6. L3 cache of core13 has a multi-copy scope directory state 314 that indicates a scope of sharing of a cache line 315 in the L3 cache of core13. L3 cache of core33 has a multi-copy scope directory state 316 that indicates a scope of sharing of a cache line 317 in the L3 cache of core33. An example of cache states that can encoded in bits of the multi-copy scope directory state 310, 312, 314, 316 for each associated cache line 311, 313, 315, 317 stored in L3 caches is illustrated in Table 1, where the multi-copy scope directory states 310, 312, 314, 316 can enumerate a plurality of scopes with a cache memory system, such as L3 cache of the cache memory system 201 of FIG. 2.

TABLE 1

Cache state examples.

| State Bits | State |
| --- | --- |
| 0000 | Invalid |
| 0110 | Shared, not intervention master |
| 1000 | Exclusive |
| 1011 | Intervention master, shared on chip scope |
| 1010 | Intervention master, shared on module scope |
| 1100 | Intervention master, shared on drawer scope |
| 1110 | Intervention master, shared on system scope |

In Table 1, the exclusive state implies an intervention master and is treated as the smallest directory scope. The scope of sharing having a smaller scope is a subset of the scope of sharing having the larger scope within the cache memory system, e.g., forming a scope hierarchy. In this example, the chip scope is the smallest shared scope, and the system scope is the largest shared scope. There is a directory entry in the cache directory for every line in the cache. There is a cache directory for each cache which is contained in the system. Some systems may have cache-less directories for tracking purposes. Embodiments can use directory entries and can work in systems with cache-less directories.

The use of chip, module, drawer, and system scopes are exemplary embodiments. These could represent any hierarchical grouping of caches into a plurality of scopes.

For purposes of explanation, a snoop scope is a scope that can be snooped. For instance, it may only be possible to snoop at the chip, drawer, and system Scopes. A multi-copy scope (or directory scope) is a scope that can be expressed in the directory. This may be a snoop scope or a subset of a snoop scope. For instance, module scope could be a subset of the drawer scope, which is a snoop scope.

An intervention master is a most recently cached copy of the cache line within the system, or if using a MESIF protocol, upon encountering a cache line in the Forward state. This forms the highest point of coherency in the system for a given cached line when one or more copies exist. Hence, non-intervention master lines are considered to have stale directory states.

Cache line requests may be received from various sources. For example, a cache line can come into a first cache from memory with a chip scope (e.g., exclusive to cache chip scope using simplified directory states). Further, a cache line can be fetched by another cache within the scope, remaining within the chip scope but shared by two caches. A cache line can be fetched by another cache within the chip scope with exclusive intent, with other caches invalidated, and the requesting cache can install the cache line exclusive with chip scope.

As another example, a cache line can be fetched by another cache within the module, becoming a module scope, which could be indicated on both the sourcing and destination cache. A cache line can be fetched with an exclusive intent by yet another cache that is within the module and returned to an exclusive chip scope with other copies invalidated.

Benefits can include limiting the fetch snoop scope to within the chip due to the chip directory lookups returning a chip scope state. In other types of systems, this may result in a maximum scope broadcast and delay the response to the requestor until all remote copies are invalidated. Embodiments can reduce not only the latency seen by a requesting processor, but also eliminate the maximum scope broadcast and all associated packets, improving system resource availability to other requests in the system. Further, instead of the traffic reduction being observed at the full system level, traffic reduction can be observed for a partial subset of the system.

Figure 4:
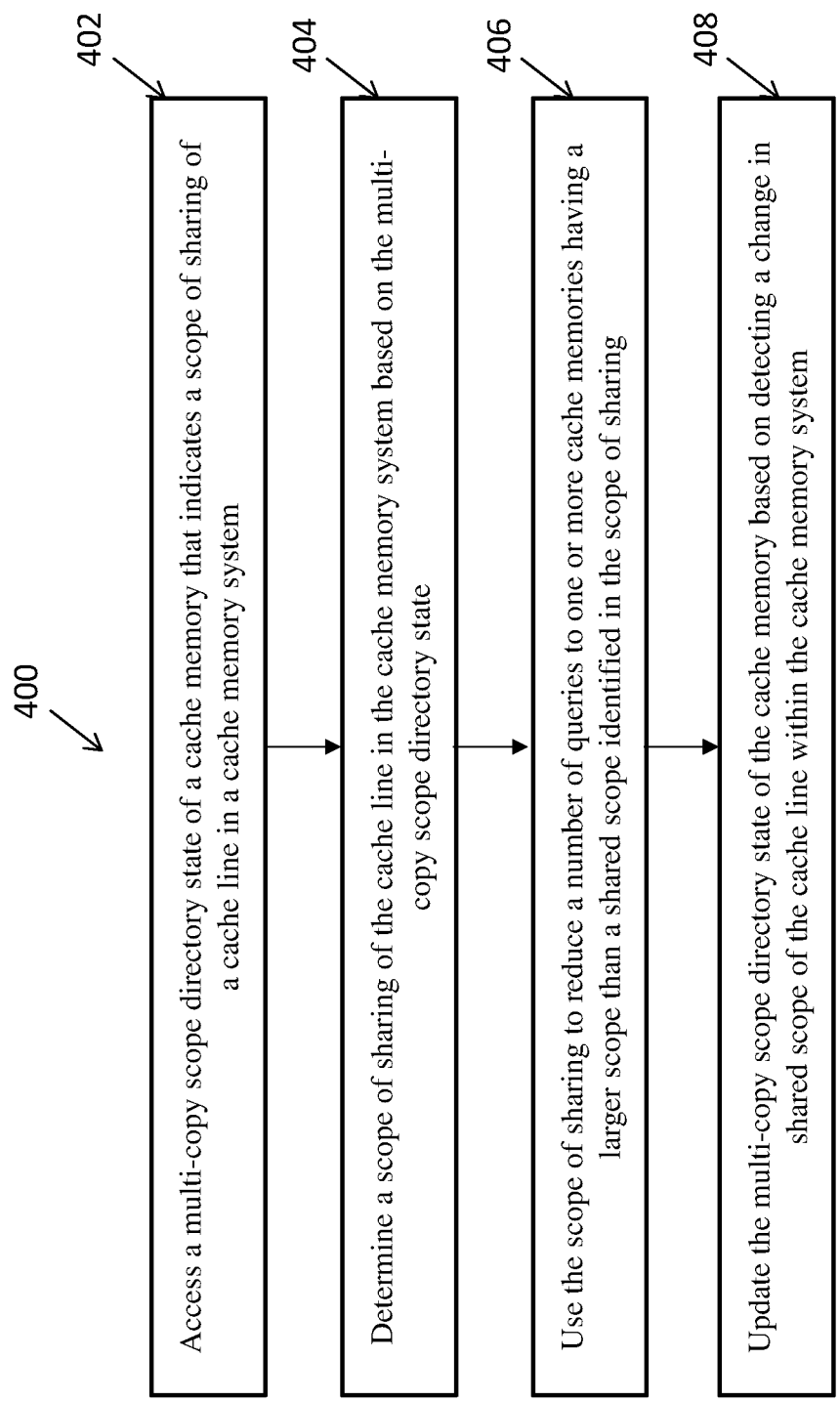
FIG. 4 depicts a flow diagram of a method for using multiple copy scoping bits for cache memory according to one or more embodiments of the invention.

FIG. 4 depicts a flow diagram of a method 400 for using multiple copy scoping bits for cache memory according to one or more embodiments of the invention. At least a portion of the method 400 can be executed, for example, by the processor 701 shown in FIG. 7. Further, the method 400 can be implemented in the system 100, 200 of FIGS. 1 and 2. For instance, the method 400 can be performed by the cache controller 212 of FIG. 2. The method 400 includes accessing a multi-copy scope directory state of a cache memory that indicates a scope of sharing of a cache line in a cache memory system, as shown in block 402. Scope sharing can be checked at various levels as depicted in the example of multiple scopes 300 of FIG. 3, such as cache lines 311, 313, 315, 317 of FIG. 3. At block 404, the method 400 includes determining a scope of sharing of the cache line in the cache memory system based on the multi-copy scope directory state, where the multi-copy scope directory state enumerates a plurality of scopes within the cache memory system. At block 406, the method 400 includes using the scope of sharing to reduce a number of queries to one or more cache memories having a larger scope than a shared scope identified in the scope of sharing. At block 408, the method 400 includes updating the multi-copy scope directory state of the cache memory based on detecting a change in shared scope of the cache line within the cache memory system.

Additional processes and/or steps may also be included in the method 400. It should be understood that the process depicted in FIG. 4 represent an illustration and that other processes may be added or existing processes may be removed, modified, or rearranged without departing from the scope of the present disclosure.

Figure 5:
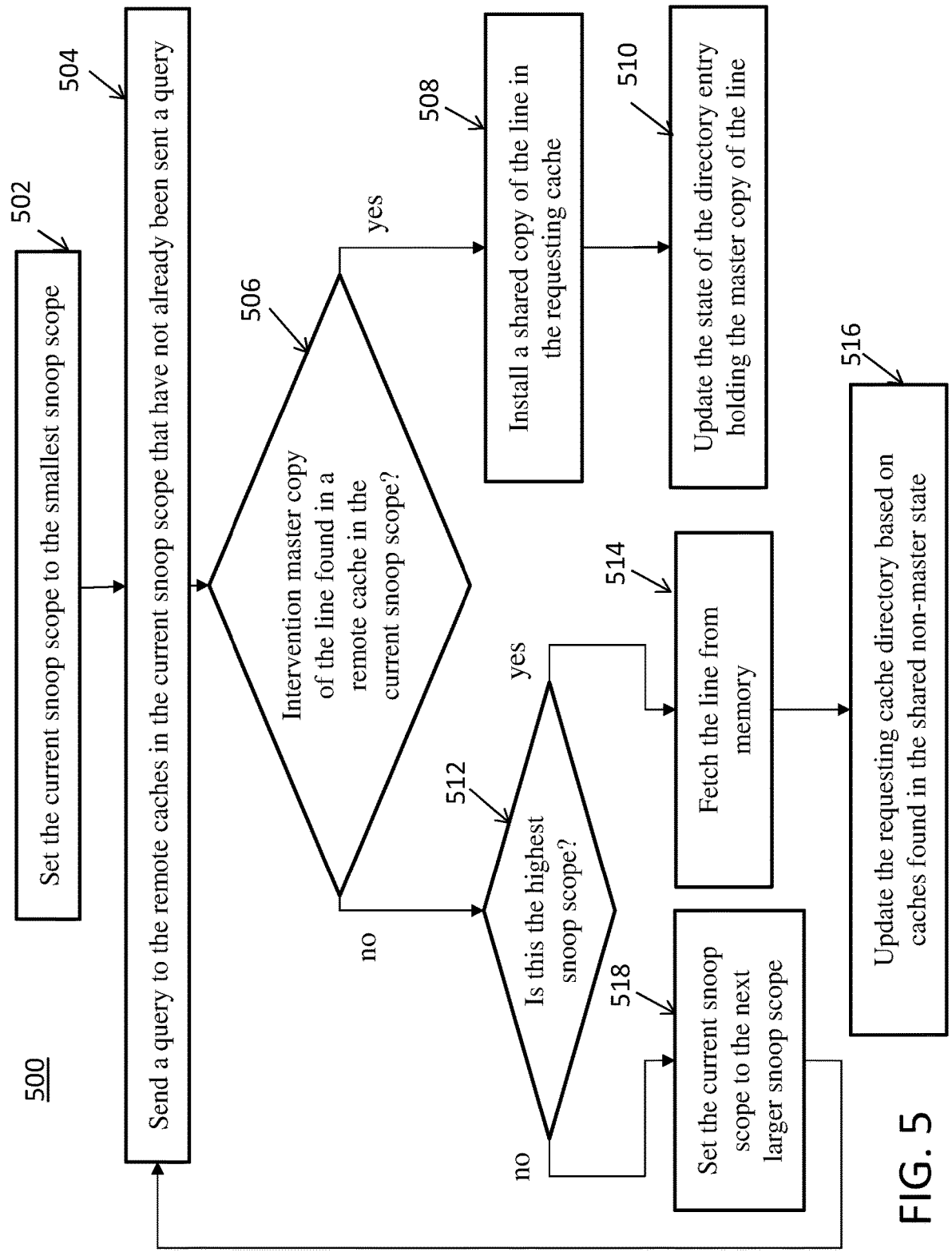
FIG. 5 depicts a flow diagram of a method for requesting a shared copy of a cache line according to one or more embodiments of the invention.

FIG. 5 depicts a flow diagram of a method 500 for requesting a shared copy of a cache line according to one or more embodiments of the invention. The method 500 can be performed, for example, by the cache controller 212 of FIG. 2.

When a requesting cache requests a shared copy of a line, such as a cache line in L3 cache of core0 in FIG. 3, at block 502, the current snoop scope is set to the smallest snoop scope. At block 504, a query is sent to the remote caches in the current snoop scope that have not already been sent a query. At block 506, a check is performed to determine whether the intervention master copy of the cache line is found in a remote cache of the current snoop scope or encountering the cache line in a forward state.

If the intervention master copy is found in a remote cache in the current snoop scope or the cache line is encountered in the forward state at block 506, then at block 508, a shared copy of the cache line is installed in the requesting cache. The directory entry for the requesting copy of the cache line can be updated to be an intervention master copy, and the directory entry for the remote cache copy of the cache line can be updated as a shared non-master copy. At block 510, the state of the directory entry holding the master copy of the cache line can be updated to reflect the directory scope that is the larger scope of the directory scope found in the remote cache directory or the smallest directory scope that includes both the requesting cache and the remote cache.

If the intervention master copy is not found in the current snoop scope at block 506, then at block 512 a check is performed to determine whether this is the highest snoop scope. If so, then at block 514, a cache line is fetched from memory. Waiting for responses can be performed as needed from cache memories within the system in response to the fetch. If any caches were found in the shared non-master state, then at block 516, the requesting cache directory for the cache line can be updated to the intervention master, shared with the lowest scope directory state that covers the requesting core and all found copies in the shared, non-master state. Otherwise, the requesting cache directory can be updated to the exclusive state for the cache line. Thus, where the initial snoop scope does not find the cache line, if the cache line is found in the next snoop scope, the directory state is updated accordingly. Directory updates can include updating at least one remote sourcing directory of the cache line.

If at block 512, this is not the highest snoop scope, then at block 518, the current snoop scope is set to the next larger snoop scope, and the flow returns to block 504.

Figure 6A:
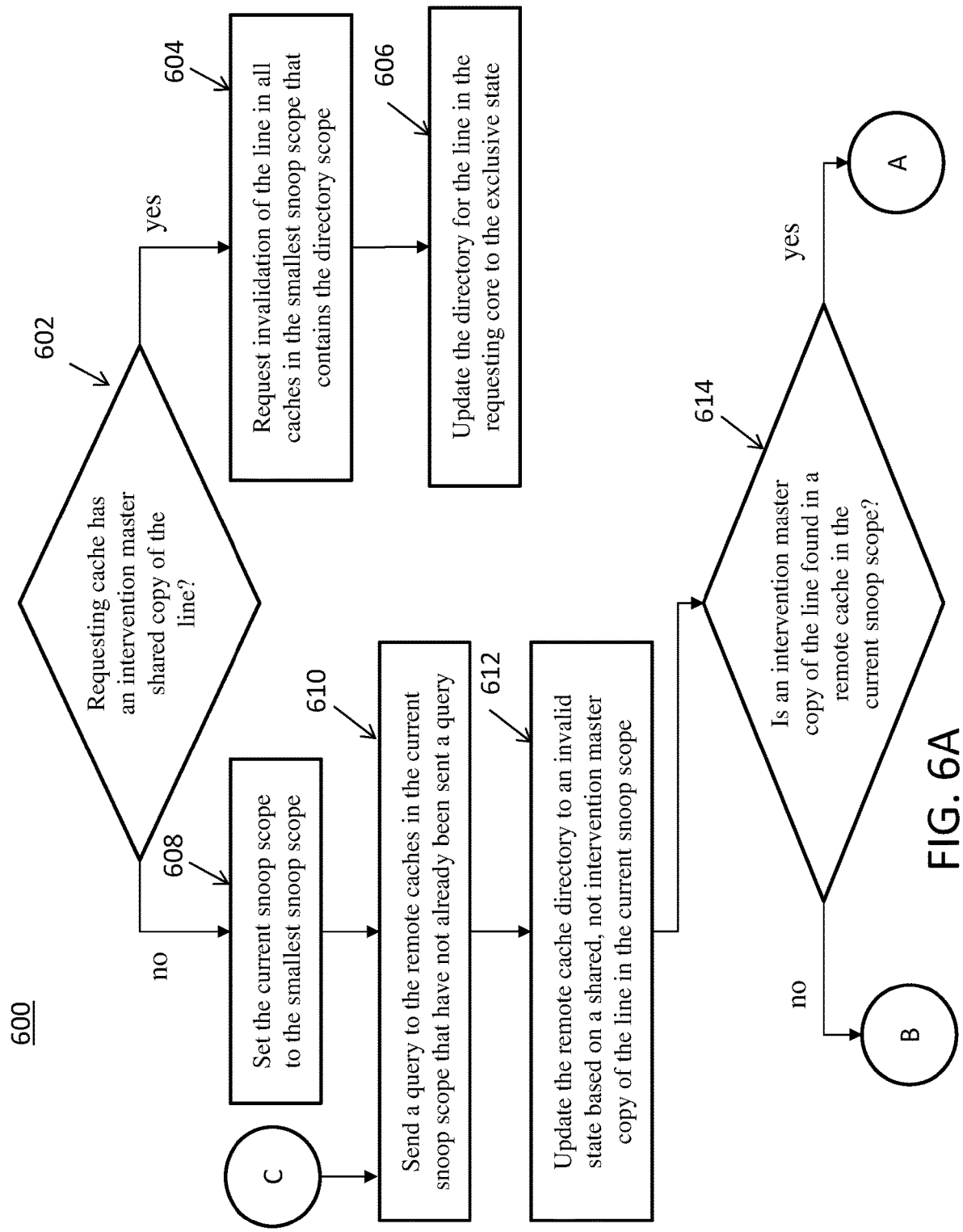
FIGS. 6A, 6B, 6C collectively depict a flow diagram of a method for requesting an exclusive copy of a cache line according to one or more embodiments of the invention.
Figure 6B:
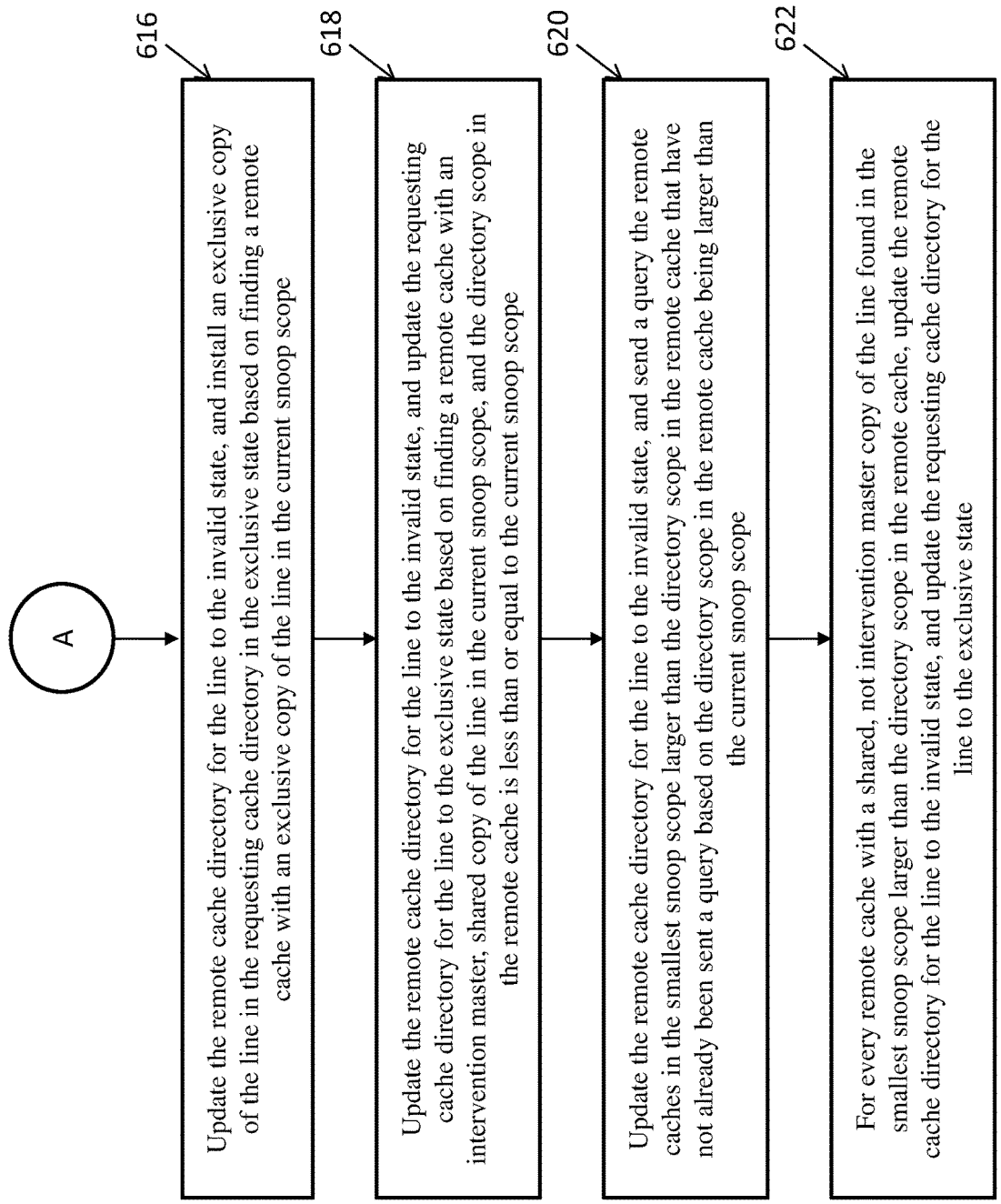
Figure 6C:
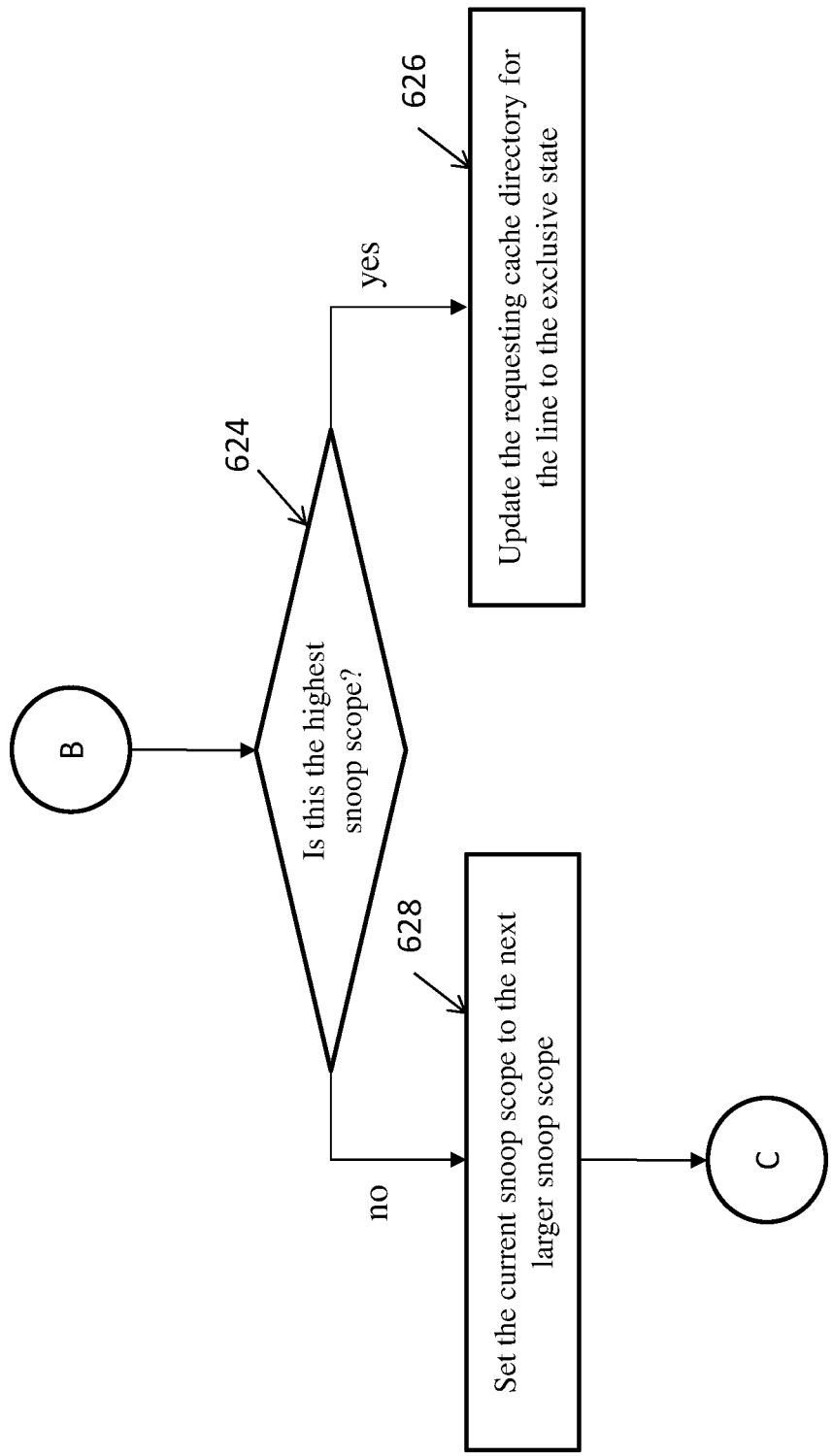

FIGS. 6A, 6B, 6C collectively depict a flow diagram of a method 600 for requesting an exclusive copy of a cache line according to one or more embodiments. The method 600 can be performed, for example, by the cache controller 212 of FIG. 2. Although depicted as a combined process flow, portions of the method 600 can be removed, subdivided, combined, or expanded in embodiments of the invention.

When a requesting cache requests an exclusive copy of a line, a check can be performed at block 602 to determine whether the requesting cache has an intervention master shared copy of the cache line. For instance, L3 cache of core0 of FIG. 3 can be a requesting cache. If the requesting cache has the intervention master shared copy of the cache line, then at block 604, invalidation of the cache line can be requested in all caches in the smallest snoop scope that contains the directory scope. Waiting may be performed until all caches in the directory scope have indicated that the cache line has been invalidated. At block 606, the directory for the cache line in the requesting core is updated to the exclusive state.

If at block 602, the requesting cache does not have the intervention master shared copy of the cache line, then at block 608, the current snoop scope is set to the smallest snoop scope. At block 610, a query is sent to the remote caches in the current snoop scope that have not already been sent a query. For every remote cache with a shared, not intervention master copy of the cache line found in the current snoop scope, at block 612, the directory of the remote cache can be set to the invalid state. If an intervention master copy of the cache line is found in a remote cache in the current snoop scope at block 614, then the method 600 can perform one or more of blocks 616-622.

At block 616, the remote cache directory is updated for the cache line to the invalid state, and an exclusive copy of the cache line is installed in the requesting cache directory in the exclusive state based on finding a remote cache with an exclusive copy of the cache line in the current snoop scope.

At block 618, the remote cache directory can be updated for the cache line to the invalid state, and the requesting cache directory is updated for the cache line to the exclusive state based on finding a remote cache with an intervention master, shared copy of the cache line in the current snoop scope, and the directory scope in the remote cache is less than or equal to the current snoop scope. Waiting can be performed, for instance, until all caches in the scope indicated by the directory scope in the remote cache have been queried. As another possibility, waiting may be performed until all caches in the smallest directory scope containing both the remote cache and the requesting cache have been queried.

At block 620, the remote cache directory for the cache line can be updated to the invalid state, and a query can be sent to the remote caches in the smallest snoop scope larger than the directory scope in the remote cache that have not already been sent a query based on the directory scope in the remote cache being larger than the current snoop scope.

At block 622, for every remote cache with a shared, not intervention master copy of the cache line found in the smallest snoop scope larger than the directory scope in the remote cache, the remote cache directory for the cache line is updated to the invalid state, and the requesting cache directory for the cache line is updated to the exclusive state. Waiting can be performed until all caches in the directory scope in the remote cache have been queried.

At block 614, if the intervention master copy is not found in a remote cache in the current snoop scope, then at block 624, it is determined whether the highest snoop scope has been reached. If the highest snoop scope has been reached, then at block 626, the requesting cache directory for the cache line is updated to the Exclusive state. Otherwise, at block 628, the current snoop scope is set to the next larger snoop scope, and the process flow returns to block 610. The intervention master copy of the cache line can be used prior to a full system state being resolved based on detecting that a primary scope does not contain the intervention master copy of the cache line, a secondary scope does contain the intervention master copy of the cache line, and a larger scope broadcast has been initiated.

Figure 7:
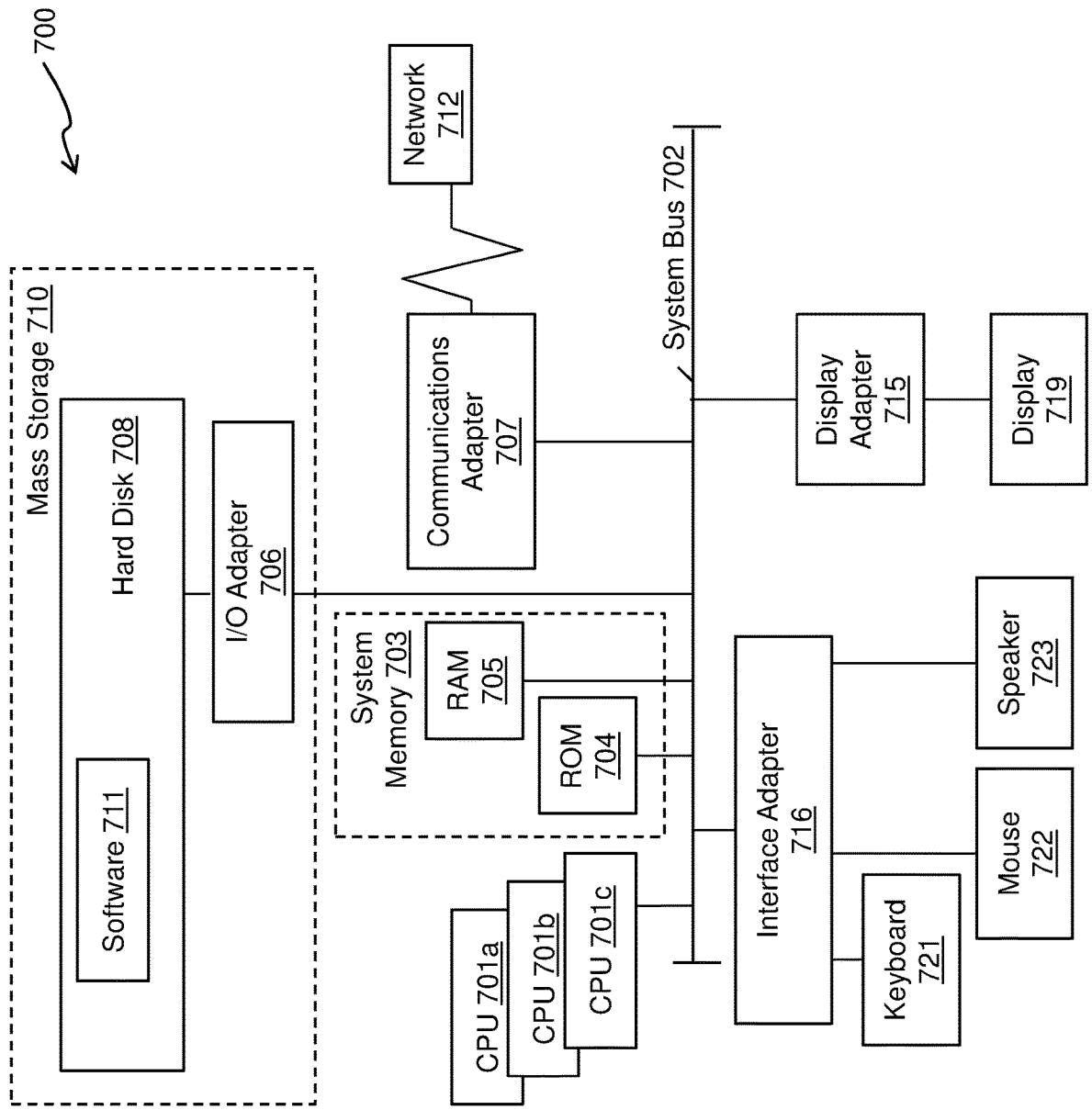
FIG. 7 depicts a block diagram of a computer system in accordance with one or more embodiments of the present invention.

Turning now to FIG. 7, a computer system 700 is generally shown in accordance with an embodiment. The computer system 700 can be an electronic, computer framework comprising and/or employing any number and combination of computing devices and networks utilizing various communication technologies, as described herein. The computer system 700 can be easily scalable, extensible, and modular, with the ability to change to different services or reconfigure some features independently of others. The computer system 700 may be, for example, a server, desktop computer, laptop computer, tablet computer, or smartphone. In some examples, computer system 700 may be a cloud computing node. Computer system 700 may be described in the general context of computer system executable instructions, such as program modules, being executed by a computer system. Generally, program modules may include routines, programs, objects, components, logic, data structures, and so on that perform particular tasks or implement particular abstract data types. Computer system 700 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system 700 has one or more central processing units (CPU(s)) 701a, 701b, 701c, etc. (collectively or generically referred to as processor(s) 701). The processors 701 can be a single-core processor, multi-core processor, computing cluster, or any number of other configurations. The processors 701, also referred to as processing circuits, are coupled via a system bus 702 to a system memory 703 and various other components. The system memory 703 can include a read only memory (ROM) 704 and a random access memory (RAM) 705. The ROM 704 is coupled to the system bus 702 and may include a basic input/output system (BIOS), which controls certain basic functions of the computer system 700. The RAM is read-write memory coupled to the system bus 702 for use by the processors 701. The system memory 703 provides temporary memory space for operations of said instructions during operation. The system memory 703 can include random access memory (RAM), read only memory, flash memory, or any other suitable memory systems.

The computer system 700 comprises an input/output (I/O) adapter 706 and a communications adapter 707 coupled to the system bus 702. The I/O adapter 706 may be a small computer system interface (SCSI) adapter that communicates with a hard disk 708 and/or any other similar component. The I/O adapter 706 and the hard disk 708 are collectively referred to herein as a mass storage 710.

Software 711 for execution on the computer system 700 may be stored in the mass storage 710. The mass storage 710 is an example of a tangible storage medium readable by the processors 701, where the software 711 is stored as instructions for execution by the processors 701 to cause the computer system 700 to operate, such as is described herein below with respect to the various Figures. Examples of computer program product and the execution of such instruction is discussed herein in more detail. The communications adapter 707 interconnects the system bus 702 with a network 712, which may be an outside network, enabling the computer system 700 to communicate with other such systems. In one embodiment, a portion of the system memory 703 and the mass storage 710 collectively store an operating system, which may be any appropriate operating system, such as the z/OS or AIX operating system from IBM Corporation, to coordinate the functions of the various components shown in FIG. 7.

Additional input/output devices are shown as connected to the system bus 702 via a display adapter 715 and an interface adapter 716. In one embodiment, the adapters 706, 707, 715, and 716 may be connected to one or more I/O buses that are connected to the system bus 702 via an intermediate bus bridge (not shown). A display 719 (e.g., a screen or a display monitor) is connected to the system bus 702 by a display adapter 715, which may include a graphics controller to improve the performance of graphics intensive applications and a video controller. A keyboard 721, a mouse 722, a speaker 723, etc. can be interconnected to the system bus 702 via the interface adapter 716, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 7, the computer system 700 includes processing capability in the form of the processors 701, and, storage capability including the system memory 703 and the mass storage 710, input means such as the keyboard 721 and the mouse 722, and output capability including the speaker 723 and the display 719.

In some embodiments, the communications adapter 707 can transmit data using any suitable interface or protocol, such as the internet small computer system interface, among others. The network 712 may be a cellular network, a radio network, a wide area network (WAN), a local area network (LAN), or the Internet, among others. An external computing device may connect to the computer system 700 through the network 712. In some examples, an external computing device may be an external webserver or a cloud computing node.

It is to be understood that the block diagram of FIG. 7 is not intended to indicate that the computer system 700 is to include all of the components shown in FIG. 7. Rather, the computer system 700 can include any appropriate fewer or additional components not illustrated in FIG. 7 (e.g., additional memory components, embedded controllers, modules, additional network interfaces, etc.). Further, the embodiments described herein with respect to computer system 700 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Technical effects can include improved computed system performance. For example, by knowing the scope of sharing within the system through the use of the multiple-copy scoping bits, the system can dynamically determine how far the requestor needs to venture out to maintain cache coherency. This can reduce event latency resolution for shared to exclusive line conversion, thus improving the overall performance of these operations in the system. Avoiding system-wide interrogations and waiting for system-wide responses can improve bus usage and interface bandwidth and can reduce controller busy time when invalidating multiple copies of a cache line.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
accessing a multi-copy scope directory state of a cache memory that indicates a scope of sharing of a cache line in a cache memory system;
determining a scope of sharing of the cache line in the cache memory system based on the multi-copy scope directory state, wherein the multi-copy scope directory state enumerates a plurality of scopes within the cache memory system;
using the scope of sharing to reduce a number of queries to one or more cache memories having a larger scope than a shared scope identified in the scope of sharing; and
updating the multi-copy scope directory state of the cache memory based on detecting a change in shared scope of the cache line within the cache memory system.

2. The computer-implemented method of claim 1, wherein the scope of sharing having a smaller scope is a subset of the scope of sharing having the larger scope within the cache memory system.

3. The computer-implemented method of claim 2, wherein the scope of sharing comprises a chip scope as a smallest scope, a module scope, a drawer scope, and a system scope as a largest scope.

4. The computer-implemented method of claim 1, further comprising:
setting a snoop scope to a smallest scope based on determining that a requesting cache has requested a shared copy of the cache line;
sending a query to one or more remote cache memories in a current snoop scope that have not already been sent a query;
determining whether an intervention master copy of the cache line is found in a remote cache memory of the current snoop scope or encountering the cache line in a forward state; and
installing a shared copy of the cache line in the requesting cache and updating a state of a directory entry holding a master copy of the cache line based on the intervention master copy of the cache line being found in a remote cache memory of the current snoop scope or encountering the cache line in the forward state.

5. The computer-implemented method of claim 4, further comprising:
fetching the cache line from the cache memory and updating a requesting cache directory based on one or more copies of the cache line being found in a shared non-master state after not finding the cache line in an initial snoop scope; and
updating at least one remote sourcing directory of the cache line.

6. The computer-implemented method of claim 1, further comprising:
determining whether a requesting cache has an intervention master shared copy of the cache line based on the requesting cache requesting an exclusive copy of the cache line;
requesting invalidation of the cache line in all cache memories in a smallest snoop scope that contains a directory scope; and
updating a requesting cache directory for the cache line in a requesting core to an exclusive state.

7. The computer-implemented method of claim 6, further comprising:
setting a current snoop scope to the smallest snoop scope based on determining that the requesting cache does not have the intervention master shared copy of the cache line;
sending a query to one or more remote caches in the current snoop scope that have not already been sent a query;
updating a remote cache directory to an invalid state based on a shared, not intervention master copy of the cache line in the current snoop scope;
updating the requesting cache directory for the cache line to the exclusive state based on determining that an intervention master copy of the cache line is not found in a remote cache in the current snoop scope and a highest snoop scope has been reached; and
setting the current snoop scope to a next larger snoop scope based on determining that the intervention master copy of the cache line is not found in the remote cache in the current snoop scope and the highest snoop scope has not been reached.

8. The computer-implemented method of claim 7, further comprising:
updating the remote cache directory for the cache line to the invalid state, and installing the exclusive copy of the cache line in the exclusive state based on finding the remote cache with the exclusive copy of the cache line in the current snoop scope and determining that the intervention master copy of the cache line is not found in the remote cache in the current snoop scope; and
updating the remote cache directory for the cache line to the invalid state, and updating the requesting cache directory for the cache line to the exclusive state based on finding the remote cache with the intervention master shared copy of the cache line in the current snoop scope, and the directory scope in the remote cache is less than or equal to the current snoop scope.

9. The computer-implemented method of claim 8, further comprising:
updating the remote cache directory for the cache line to the invalid state, and sending a query to the remote caches in the smallest snoop scope larger than the directory scope in the remote cache that have not already been sent the query based on the directory scope in the remote cache being larger than the current snoop scope;
updating the remote cache directory for the cache line to the invalid state; and
updating the requesting cache directory for the cache line to the exclusive state.

10. The computer-implemented method of claim 7, further comprising:
using the intervention master copy of the cache line prior to a full system state being resolved based on detecting that a primary scope does not contain the intervention master copy of the cache line, a secondary scope does contain the intervention master copy of the cache line, and a larger scope broadcast has been initiated.

11. A system comprising:
a plurality of processors;
a cache memory system; and a cache controller configured to perform operations comprising:
   accessing a multi-copy scope directory state of a cache memory that indicates a scope of sharing of a cache line in the cache memory system;
   determining a scope of sharing of the cache line in the cache memory system based on the multi-copy scope directory state, wherein the multi-copy scope directory state enumerates a plurality of scopes within the cache memory system;
   using the scope of sharing to reduce a number of queries to one or more cache memories having a larger scope than a shared scope identified in the scope of sharing; and
   updating the multi-copy scope directory state of the cache memory based on detecting a change in shared scope of the cache line within the cache memory system.

12. The system of claim 11, wherein the scope of sharing having a smaller scope is a subset of the scope of sharing having the larger scope within the cache memory system.

13. The system of claim 12, wherein the scope of sharing comprises a chip scope as a smallest scope, a module scope, a drawer scope, and a system scope as a largest scope.

14. The system of claim 11, wherein the cache controller is configured to perform operations comprising:
   setting a snoop scope to a smallest scope based on determining that a requesting cache has requested a shared copy of the cache line;
   sending a query to one or more remote cache memories in a current snoop scope that have not already been sent a query;
   determining whether an intervention master copy of the cache line is found in a remote cache memory of the current snoop scope or encountering the cache line in a forward state; and
   installing a shared copy of the cache line in the requesting cache and updating a state of a directory entry holding a master copy of the cache line based on the intervention master copy of the cache line being found in a remote cache memory of the current snoop scope or encountering the cache line in the forward state.

15. The system of claim 14, wherein the cache controller is configured to perform operations comprising:
   fetching the cache line from the cache memory and updating a requesting cache directory based on one or more copies of the cache line being found in a shared non-master state after not finding the cache line in an initial snoop scope; and
   updating at least one remote sourcing directory of the cache line.

16. The system of claim 11, wherein the cache controller is configured to perform operations comprising:
   determining whether a requesting cache has an intervention master shared copy of the cache line based on a requesting cache requesting an exclusive copy of the cache line;
   requesting invalidation of the cache line in all cache memories in a smallest snoop scope that contains a directory scope; and
   updating a requesting cache directory for the cache line in a requesting core to an exclusive state.

17. The system of claim 16, wherein the cache controller is configured to perform operations comprising:
   setting a current snoop scope to the smallest snoop scope based on determining that the requesting cache does not have the intervention master shared copy of the cache line;
   sending a query to one or more remote caches in the current snoop scope that have not already been sent a query;
   updating a remote cache directory to an invalid state based on a shared, not intervention master copy of the cache line in the current snoop scope;
   updating the requesting cache directory for the cache line to the exclusive state based on determining that an intervention master copy of the cache line is not found in a remote cache in the current snoop scope and a highest snoop scope has been reached; and
   setting the current snoop scope to a next larger snoop scope based on determining that an intervention master copy of the cache line is not found in a remote cache in the current snoop scope and the highest snoop scope has not been reached.

18. The system of claim 17, wherein the cache controller is configured to perform operations comprising:
   updating the remote cache directory for the cache line to the invalid state, and installing the exclusive copy of the cache line in the exclusive state based on finding the remote cache with the exclusive copy of the cache line in the current snoop scope and determining that the intervention master copy of the cache line is not found in the remote cache in the current snoop scope; and
   updating the remote cache directory for the cache line to the invalid state, and updating the requesting cache directory for the cache line to the exclusive state based on finding the remote cache with the intervention master shared copy of the cache line in the current snoop scope, and the directory scope in the remote cache is less than or equal to the current snoop scope.

19. The system of claim 18, wherein the cache controller is configured to perform operations comprising:
   updating the remote cache directory for the cache line to the invalid state, and sending a query to the remote caches in the smallest snoop scope larger than the directory scope in the remote cache that have not already been sent the query based on the directory scope in the remote cache being larger than the current snoop scope;
   updating the remote cache directory for the cache line to the invalid state; and
   updating the requesting cache directory for the cache line to the exclusive state.

20. A computer program product comprising a computer readable storage medium having program instructions embodied therewith, the program instructions executable by one or more processors to cause the one or more processors to perform operations comprising:
   accessing a multi-copy scope directory state of a cache memory that indicates a scope of sharing of a cache line in a cache memory system;
   determining a scope of sharing of the cache line in the cache memory system based on the multi-copy scope directory state, wherein the multi-copy scope directory state enumerates a plurality of scopes within the cache memory system;
   using the scope of sharing to reduce a number of queries to one or more cache memories having a larger scope than a shared scope identified in the scope of sharing; and updating the multi-copy scope directory state of the cache memory based on detecting a change in shared scope of the cache line within the cache memory system.

21. The computer program product of claim 20, wherein the scope of sharing having a smaller scope is a subset of the scope of sharing having the larger scope within the cache memory system, and wherein the scope of sharing comprises a chip scope as a smallest scope, a module scope, a drawer scope, and a system scope as a largest scope.

22. The computer program product of claim 20, wherein the program instructions are executable by the one or more processors to cause the one or more processors to perform operations comprising:
  setting a snoop scope to a smallest scope based on determining that a requesting cache has requested a shared copy of the cache line;
  sending a query to one or more remote cache memories in a current snoop scope that have not already been sent a query;
  determining whether an intervention master copy of the cache line is found in a remote cache memory of the current snoop scope or encountering the cache line in a forward state; and
  installing a shared copy of the cache line in the requesting cache and updating a state of a directory entry holding a master copy of the cache line based on the intervention master copy of the cache line being found in a remote cache memory of the current snoop scope or encountering the cache line in the forward state.

23. The computer program product of claim 22, wherein the program instructions are executable by the one or more processors to cause the one or more processors to perform operations comprising:
  fetching the cache line from the cache memory and updating a requesting cache directory based on one or more copies of the cache line being found in a shared non-master state after not finding the cache line in an initial snoop scope; and
  updating at least one remote sourcing directory of the cache line.

24. The computer program product of claim 20, wherein the program instructions are executable by the one or more processors to cause the one or more processors to perform operations comprising:
  determining whether a requesting cache has an intervention master shared copy of the cache line based on the requesting cache requesting an exclusive copy of the cache line;
  requesting invalidation of the cache line in all cache memories in a smallest snoop scope that contains a directory scope; and
  updating a requesting cache directory for the cache line in a requesting core to an exclusive state.

25. The computer program product of claim 24, wherein the program instructions are executable by the one or more processors to cause the one or more processors to perform operations comprising:
  setting a current snoop scope to the smallest snoop scope based on determining that the requesting cache does not have the intervention master shared copy of the cache line;
  sending a query to one or more remote caches in the current snoop scope that have not already been sent a query;
  updating a remote cache directory to an invalid state based on a shared, not intervention master copy of the cache line in the current snoop scope;
  updating the requesting cache directory for the cache line to the exclusive state based on determining that an intervention master copy of the cache line is not found in a remote cache in the current snoop scope and a highest snoop scope has been reached;
  setting the current snoop scope to a next larger snoop scope based on determining that the intervention master copy of the cache line is not found in the remote cache in the current snoop scope and the highest snoop scope has not been reached;
  updating the remote cache directory for the cache line to the invalid state, and installing the exclusive copy of the cache line in the exclusive state based on finding the remote cache with the exclusive copy of the cache line in the current snoop scope and determining that the intervention master copy of the cache line is not found in the remote cache in the current snoop scope;
  updating the remote cache directory for the cache line to the invalid state, and updating the requesting cache directory for the cache line to the exclusive state based on finding the remote cache with the intervention master shared copy of the cache line in the current snoop scope, and the directory scope in the remote cache is less than or equal to the current snoop scope;
  updating the remote cache directory for the cache line to the invalid state, and sending a query to the remote caches in the smallest snoop scope larger than the directory scope in the remote cache that have not already been sent the query based on the directory scope in the remote cache being larger than the current snoop scope;
  updating the remote cache directory for the cache line to the invalid state; and
  updating the requesting cache directory for the cache line to the exclusive state.

* * * * *